P. A. CAMPBELL.
ELECTRICAL MEASURING INSTRUMENT.
APPLICATION FILED JAN. 3, 1910.

1,144,636.

Patented June 29, 1915.
3 SHEETS—SHEET 1.

WITNESSES:
C. L. Belcher
Otto S. Schairer

INVENTOR
Percy A. Campbell
BY
ATTORNEY

P. A. CAMPBELL.
ELECTRICAL MEASURING INSTRUMENT.
APPLICATION FILED JAN. 3, 1910.

1,144,636.

Patented June 29, 1915.
3 SHEETS—SHEET 3.

WITNESSES:
C. L. Belcher
Otto S. Schairer

INVENTOR
Percy A. Campbell
BY
Kelley G. Carr
ATTORNEY

UNITED STATES PATENT OFFICE.

PERCY A. CAMPBELL, OF NEWARK, NEW JERSEY, ASSIGNOR TO WESTINGHOUSE LAMP COMPANY, A CORPORATION OF PENNSYLVANIA.

ELECTRICAL MEASURING INSTRUMENT.

1,144,636.  Specification of Letters Patent.  Patented June 29, 1915.

Application filed January 3, 1910. Serial No. 536,117.

*To all whom it may concern:*

Be it known that I, PERCY A. CAMPBELL, a citizen of the United States, and a resident of Newark, in the county of Essex and State of New Jersey, have invented a new and useful Improvement in Electrical Measuring Instruments, of which the following is a specification.

My invention relates to electrical resistance measuring instruments, and it has for its object to provide an instrument whereby the resistances of incandescent lamp filaments may be expeditiously and accurately determined.

In the manufacture of electric incandescent lamps in which the filaments comprise a plurality of sections that are joined or connected at their extremities, it is highly desirable to ascertain the resistances of the filament sections before they are placed in lamps, in order that all of the sections employed in each lamp may be of substantially the same specific resistance. When lamps are constructed in this manner, all of the filament sections are heated to substantially the same temperature and degree of incandescence, and, consequently, they have substantially uniform life. By properly rating the lamps, they will have greater and more uniform life than they would have if the filaments were not of uniform resistance.

It is the specific object of the present invention to provide an instrument for conveniently, expeditiously and accurately measuring the resistances of the sections of incandescent lamp filaments.

Figure 1:
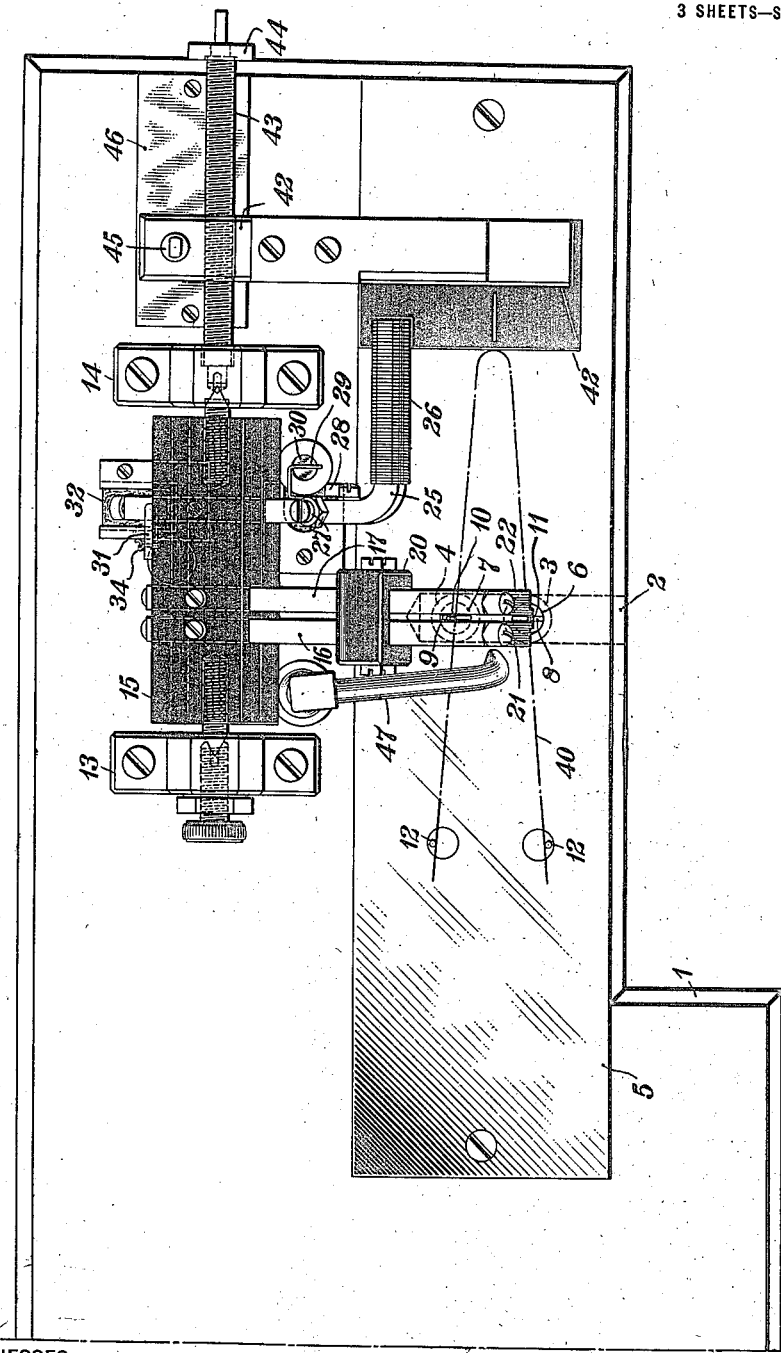
Figure 2:
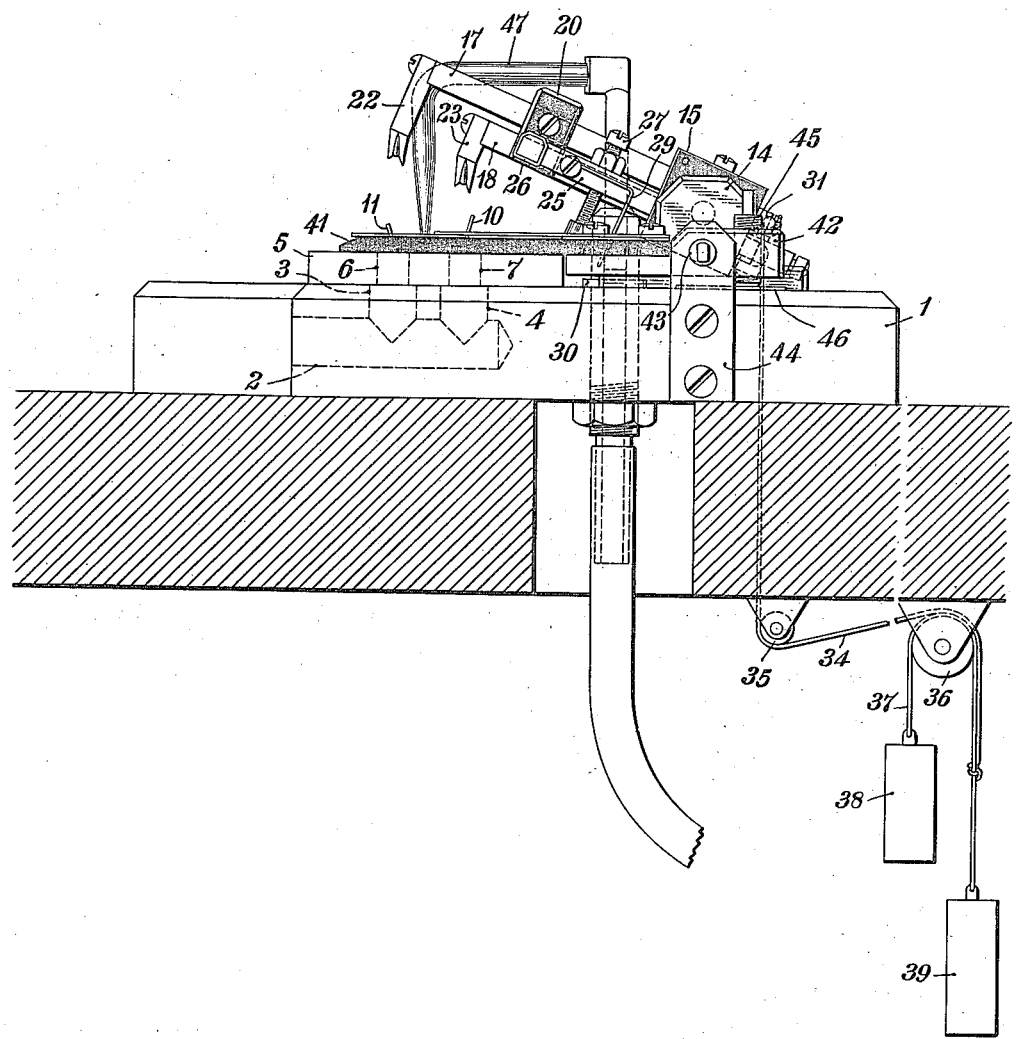
Figure 3:
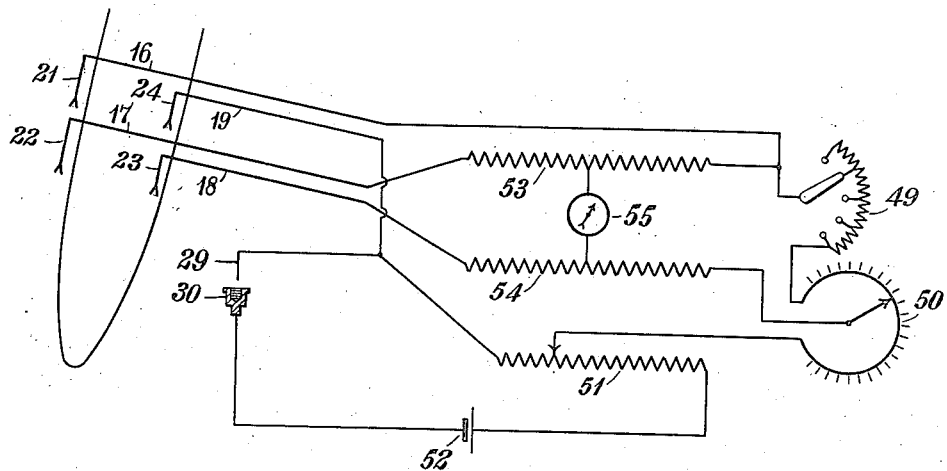

The invention is illustrated in the accompanying drawings, Figure 1 of which is a plan view of an instrument embodying the same. Fig. 2 is a view, in end elevation, of the instrument, and Fig. 3 is a diagrammatic view illustrating its circuit connections.

The method of measuring practised by the instrument is that commonly known as the "Thompson double bridge method," because of the accuracy of the results that may be obtained thereby.

The instrument comprises a base 1 having a horizontally drilled passage 2 in one of its edges and two vertically drilled recesses 3 and 4 extending downwardly into the base from its upper face and communicating with the passage 2. The passage 2 is provided for the purpose of permitting of ready cleaning of the recesses 3 and 4. Secured upon the upper face of the base, and along one edge thereof, is a glass plate 5 having apertures 6 and 7 directly above and corresponding to the recesses 3 and 4 in the base. Extending centrally across the apertures 6 and 7 in the plate 5 are partitions 8 and 9 carrying wire stops 10 and 11 that project above the surface of the plate 5 to assist in positioning the filament sections during the measurement of their resistances. Other stops 12 are also mounted in the upper face of the plate 5 for the same purpose.

Secured upon the upper face of the base 1, and at one side of the glass plate 5, are bearing posts 13 and 14, between which a two-part insulating block 15 is pivotally mounted. Secured in the block 15, and projecting from one side thereof, are four arms 16, 17, 18 and 19, that are arranged in pairs, the arms 16 and 17, which constitute one pair, being longer than, and mounted directly above, the arms 18 and 19, constituting the other pair. The said arms are all insulated from each other, and are secured in invariable relation to each other near their outer ends in an insulating block 20. To the outer ends of the arms 16 to 19, inclusive, are secured terminal members 21, 22, 23 and 24, respectively, having forked extremities preferably composed of copper, or of other material which may be amalgamated, or for which mercury possesses a high degree of capillary attraction, the spaces between the prongs of the forked terminal members being filled with mercury. The inner faces of the prongs of the terminal members diverge from each other, so that the mercury is maintained in the upper ends of the spaces between them by capillary action.

The arms 16 to 19, inclusive, and the terminal devices carried thereby, are so constructed and arranged that, when the block 15 is rotated, the terminal devices 21 to 24, inclusive, will enter the apertures 6 and 7 in the plate 5, the members 21 and 22 entering the aperture 6 upon opposite sides of the partition 8, and the members 23 and 24 entering the aperture 7 upon opposite sides of the partition 9. Also mounted in and projecting through the insulating block 15, is an L-shaped arm 25, the forward free end of which is covered with leather 26 and is conveniently disposed to permit of effecting manual rotation of the block 15. The movements of the arm 25 and of the block 15 and its associated parts are limited by means of an adjustable stop 27 that is threaded in the arm 25 and is adapted to engage a cork or other suitable cushion 28 that is secured upon the upper face of the base 1. Secured to the front end of the arm 25 is a terminal member 29 that is adapted to project into a cup 30 containing mercury and constituting the other circuit terminal. At the rear end of the arm 25 is a smaller L-shaped arm 31 that extends substantially vertically through the arm 25 and projects laterally therefrom, its lower end normally resting upon a cushion 32 upon the upper face of the base 1. The parts are normally maintained in the positions illustrated by means of a cord or cable 34 that is attached to the free end of the laterally projecting portion of the arm 31, extends downwardly through the base 1, and, after passing over pulleys 35 and 36, is attached to another cord or cable 37 that also passes over the pulley 36 and to the ends of which two weights 38 and 39, of different sizes, are attached, the object of this arrangement being to provide considerable inertia for the movable parts so as to prevent too rapid movement thereof.

A filament section 40 is placed for resistance measurement upon the glass plate 5, substantially as illustrated in Fig. 1, and the length of a predetermined portion thereof, the resistance of which is to be measured, is accurately determined by the distance between a plate or stop 41 and the stops 10 and 11, of the terminal members 22 and 23. The stop 41 is carried by a block 42 that is threaded upon a rod or shaft 43 having bearings at its ends respectively in the bearing post 14 and in a post 44 that is secured to one end of the base 1, the outer end of the rod being flattened to permit of ready turning thereof by means of a wrench or other tool. By this means, the position of the stop 41 may be accurately determined, and it is maintained firmly against the glass plate 5 so that the filament sections cannot get between it and the plate 5, by means of a screw 45 that is threaded in the block 42 and bears upon a plate 46 secured to the upper face of the base 1.

In order to facilitate handling of the filament sections and of placing and maintaining them in their correct positions during the resistance measurements, a blast of air is directed, preferably at a slight angle to the vertical, upon the upper face of the glass plate 5 between the stops 10 and 11 by means of a pipe 47 that communicates with any suitable source of air pressure (not shown). The air pressure should be sufficient to force the legs of the filament outwardly against the stops 10 and 11. This is regarded as a very important feature of the instruments, because it facilitates and insures accurate positioning of the filament sections.

The electrical connections of the instrument are illustrated in Fig. 3, in which it will be seen that the arms 16 and 19 are connected in series with two adjustable resistance devices 49 and 50, the combined resistance of which may be made equal to that of the filament 40, and with a portion of a resistance 51 that is adapted to be connected in series with a battery 52 by the parts 29 and 30. While this is the preferable arrangement, the battery may, if desired, be included directly in series with the arms 16 and 19 and the resistances 49 and 50. The arms 17 and 18 are connected respectively to the terminals of very high resistances 53 and 54, between approximately the middle or other suitable intermediate points of which a galvanometer 55 is connected, the remaining terminal of the resistance 53 being connected to one terminal of the resistance 49, and the remaining terminal of the resistance 54 being adapted to be connected to a suitable intermediate point of resistance 50, or to its other terminal.

In the operation of the device, a filament section 40 is placed in position upon the plate 5 and its legs are forced against the stops 10 and 11 by the blast of air from the pipe 47. The free end of the arm 25 is then manually depressed so as to cause the terminal members 21 to 24, inclusive, to enter the apertures in the plate 5 with the forked extremities thereof straddling the filament and the mercury held between the prongs engaging the filament. At the same time, the circuit is completed by means of the switch device 29—30. If the resistance included between the terminals of the resistances 53 and 54 is equal to that of the filament section between the terminal devices 22 and 23, no difference of potential will exist between the terminals of the galvanometer 55, and, consequently, the galvanometer will indicate no deflection. If, however, the resistance included between the terminals of the resistances 53 and 54 is not the same as that of the portion of the filament section between the terminal devices 22 and 23, a deflection of the galvanometer will result, and the resistances of the devices 49 and 50 should be adjusted until the galvanometer indicates no deflection. By calibrating the resistance devices 49 and 50, the filament resistance corresponding to each position of the movable members of the said devices will be known, so that as soon as the galvanometer indicates no deflection, the resistance of the filament section being measured is definitely and accurately determined.

I claim as my invention:

1. An instrument of the character described comprising a plurality of movable terminal devices that carry bodies of mercury, a base having recesses for the reception of the terminal devices, and means for normally maintaining the terminal devices out of the recesses.

2. An instrument of the character described comprising a plurality of movable forked terminal devices, mercury supported in and carried by the said devices, a base having recesses for the reception of the terminal devices, and means for normally maintaining the terminal devices out of the said recesses.

3. An instrument of the character described comprising a plurality of movable terminal devices, a base having recesses for the reception of the terminal devices, means for normally maintaining the terminal devices out of the said recesses, and means for establishing the circuit to the terminal devices when they occupy the recesses.

4. An electrical terminal device comprising a forked member and mercury engaging and carried by the prongs of the member.

5. An electrical terminal device comprising a forked member the prongs of which diverge, and mercury engaging and carried by the prongs of the member.

6. An electrical terminal device comprising a forked member the prongs of which diverge and are amalgamated, and mercury between and carried by the prongs of the fork.

7. An electrical terminal device having spaced side members and a liquid conductor located between, engaging and carried by the said side members.

8. An electrical terminal device having spaced amalgamated side members and mercury located between and carried by the said members.

9. An electrical terminal device having spaced side members and mercury located between, engaging and carried by the said members.

10. An instrument for operating upon filaments comprising a base, a plurality of terminal devices, and means for directing an air blast upon the base to retain a filament in position to be engaged by the terminal devices.

11. An instrument for operating upon filaments comprising a base, a plurality of terminal devices, stops carried by the base, and means for directing an air blast obliquely upon the base to retain a filament against the stops and in position to be engaged by the terminal devices.

12. An instrument for operating upon filaments comprising a movable terminal device, a base having a recess for the reception of the terminal device, and means for retaining a filament in position to be engaged by the movable terminal device when it enters the recess.

13. An instrument for operating upon filaments comprising a plurality of movable forked terminal devices, mercury carried in and supported by the said devices, a base having recesses for the reception of the terminal devices, means for normally maintaining the terminal devices out of the said recesses, and means for retaining a filament in position to be engaged by the movable terminal devices when they enter the recesses.

In testimony whereof, I have hereunto subscribed my name this 24th day of December, 1909.

PERCY A. CAMPBELL.

Witnesses:
A. YOUNGHOLM,
CHARLES E. KELLY.